United States Patent [19]

Mitchell

[11] Patent Number: 4,665,771
[45] Date of Patent: May 19, 1987

[54] HYPOCYCLIC DRIVE

[76] Inventor: Frank R. Mitchell, 712 Fair Oaks Ave., South Pasadena, Calif. 91030

[21] Appl. No.: 660,722

[22] Filed: Oct. 15, 1984

[51] Int. Cl.$^4$ .......................................... F16H 13/08
[52] U.S. Cl. ...................................... 74/788; 74/798; 74/804
[58] Field of Search ................. 74/788, 797, 798, 801, 74/803, 804

[56] References Cited

U.S. PATENT DOCUMENTS

| | | | |
|---|---|---|---|
| 3,160,032 | 12/1964 | Black | 74/804 |
| 3,424,036 | 1/1969 | Colgan | 74/805 |
| 3,478,623 | 11/1969 | Noguchi | 74/804 X |
| 3,602,070 | 8/1971 | Verge et al. | 74/804 |
| 4,183,267 | 1/1980 | Jackson | 74/804 |
| 4,407,170 | 10/1983 | Fukui | 74/797 X |

FOREIGN PATENT DOCUMENTS

| | | | |
|---|---|---|---|
| 1904039 | 9/1969 | Fed. Rep. of Germany | 74/804 |
| 1958635 | 6/1970 | Fed. Rep. of Germany | 74/804 |
| 2503908 | 8/1975 | Fed. Rep. of Germany | 74/804 |

*Primary Examiner*—Leslie A. Braun
*Assistant Examiner*—Dwight G. Diehl

[57] ABSTRACT

A traction drive and speed changing device with a pair of aligned shafts extending out of opposite ends of a housing and in alignment. Contained within the housing is an internal race or annular bearing surface. A pair of rollers, each of lesser diameter than the race are interconnected by a first crank which maintains the rollers in frictional engagement with the race. A second crank couples the first roller to the input shaft. A third crank couples the first roller to the output shaft. A speed reduction related to the difference in diameters of the roller and the race. An annular version suitable for providing speed changes for a rotating body and to allow cables or conduits to pass through the device.

30 Claims, 6 Drawing Figures

HYPOCYCLIC DRIVE

BACKGROUND OF THE INVENTION

A longstanding continuing need has existed for a truly effective speed changing device for mechanical systems, particularly those which are gearless, commonly referred to as traction drives. Most available traction drive systems are limited to a speed change ratio in the order of 10 to 1, and even with such a low ratio do not exhibit the properties of low backlash, high torque capacity and high efficiency.

Often, traction drive devices employ epicyclic drive members with a series of planetary members encircling a sun member. Rotational motion is transmitted via the sun member with highly concentrated loading on the surface of the sun member. Torque is limited in such systems, the system tends to have lower efficiency than is desired and the energy lost is converted to heat in the region of the sun member at the innermost region of the system and difficult to remove. Such systems also exhibit a significant amount of backlash unless they are loaded so severely that efficiency suffers.

A number of prior researchers have attempted through the years to improve traction drive systems and in the process have improved one characteristic, usually at the sacrifice of other parameters of the system.

Desired is a traction drive system which achieves all of the following:
1. A high speed change ratio, e.g. up to and greater than 100:1;
2. Low backlash;
3. Linearity of speed between input and output;
4. High efficiency;
5. Easily cooled;
6. High torque capability;
7. Balanced loading within the system;
8. Freedom from harmonics; and
9. Concentricity of input and output.

Additionally, it is often desired that an annular configuration be possible for the drive system.

Heretofore, the geared system has been selected where high torque transfer is required and high speed change ratio desired. The geared system, however, has inherent backlash which eliminates its use where precision non-backlash is needed or where freedom from harmonics is essential. Examples of geared speed change systems are shown in the following U.S. patents:

| 4,228,698 | M. E. Winiasz | October 21, 1980 |
| 4,155,276 | W. H. Fengler | May 22, 1979 |
| 4,016,780 | S. J. Baranyi | April 12, 1977 |
| 3,424,036 | W. L. Colgan | Jan. 29, 1969 |
| 3,330,171 | A. L. Nasvytis | July 11, 1967 |
| 3,442,158 | E. Marcus | May 6, 1969 |

Where harmonic suppression and reduced backlash is desired at the loss of torque handling ability, the traction drive has been adopted. Examples of such systems appear in the following U.S. patents:

| 4,128,016 | A. L. Nasvytis | Dec. 5, 1978 |
| 4,112,787 | H. Tippmann | Sept. 12, 1978 |
| 3,941,004 | C. E. Kraus | March 2, 1976 |
| 3,889,554 | B. J. Sinclair | June 17, 1975 |
| 3,848,476 | C. E. Kraus | Nov. 19, 1976 |
| 3,254,546 | A. L. Nasvytis | June 7, 1966 |
| 3,286,550 | C. Rosain et al | Nov. 22, 1966 |
| 3,216,285 | A. L. Nasvytis | Nov. 9, 1965 |
| 2,837,937 | C. E. Kraus | June 10, 1958 |
| 2,656,737 | G. L. Lang | Oct. 27, 1953 |

Each of these systems offer the general advantages of traction drives but exhibit the traditional limitations of traction drive systems outlined above. Continued research to the date of my invention has failed to meet the full needs for traction drives.

BRIEF DESCRIPTION OF THE INVENTION

Basically my invention involves an annular bearing surface in which a pair of rollers of diameter smaller than the annular surface are journaled for rotation. The rollers are connected to each other by a crank having a crank arm slightly greater in length than the difference between the roller diameter and the annular bearing surface. The crank causes the rollers to engage the annular bearing surface at diametrically opposed positions. Means are provided to introduce hypocyclic motion into one roller and extract rotary motion via a second crank or spider coupled to a shaft. The device produces a change in speed therethrough which is a function of the difference in diameters noted above. The device provides large speed changes, linearity between input and output shafts and high torque carrying capability. The rollers and interconnecting cranks comprise a binary synchronous eccentrically coupled roller assembly.

In a first embodiment the rotational motion is introduced and extracted via axially aligned shafts. In a second embodiment, the rollers are themselves hollow and the entire assembly is annular.

BRIEF DESCRIPTION OF THE DRAWING

This invention may be more clearly understood from the following detailed description and by reference to the drawing in which.

DETAILED DESCRIPTION OF THE INVENTION

Figure 1:
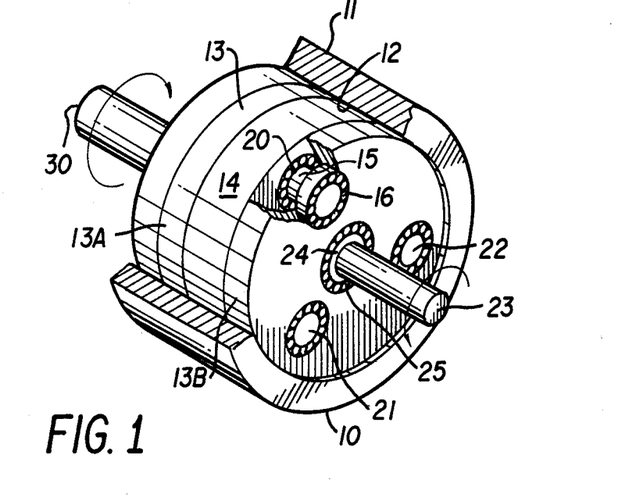
FIG. 1 is a perspective view, partly broken away, showing the basic combination of this invention.

For an understanding of my invention, attention is directed to FIG. 1 which constitutes a perspective view with portions broken away of a speed changer in the order of 100 to 1, and in one embodiment, is 4 inches in diameter, 3½ inches in length and has input and output shafts of 0.25 inch and 0.50 inch respectively with a maximum permissible torque capability of 400 inch pounds. The embodiment of FIG. 1 illustrates the principle of this invention and is useful in applications such as servo systems with low backlash requirements, high speed machinery such as gas turbine systems, and harmonic or vibration sensitive precision drive systems such as photographic emulsion coating machines.

Referring now to FIG. 1, the speed changer, generally designated 10, includes a stator or load ring 11 which defines an internal annular bearing surface 12 upon which a pair of internal hypocyclic roller members 13 and 14 are positioned. The rollers 13 and 14 have a difference in diameter from the diameter of the bearing surface 12 which constitutes a measure of the speed change of the device in accordance with the following formula:

$$SC = \frac{D_R}{D_R - D_S} \quad (1)$$

SC is negative to indicate direction reversal since the denominator is always negative with the roller diameter less than its encircling annular stator surface.

Where SC is the speed change ratio between the input and output shafts, $D_R$ is the diameter of the hypocyclic roller and $D_S$ is the diameter of the annular stator surface.

Figure 3:
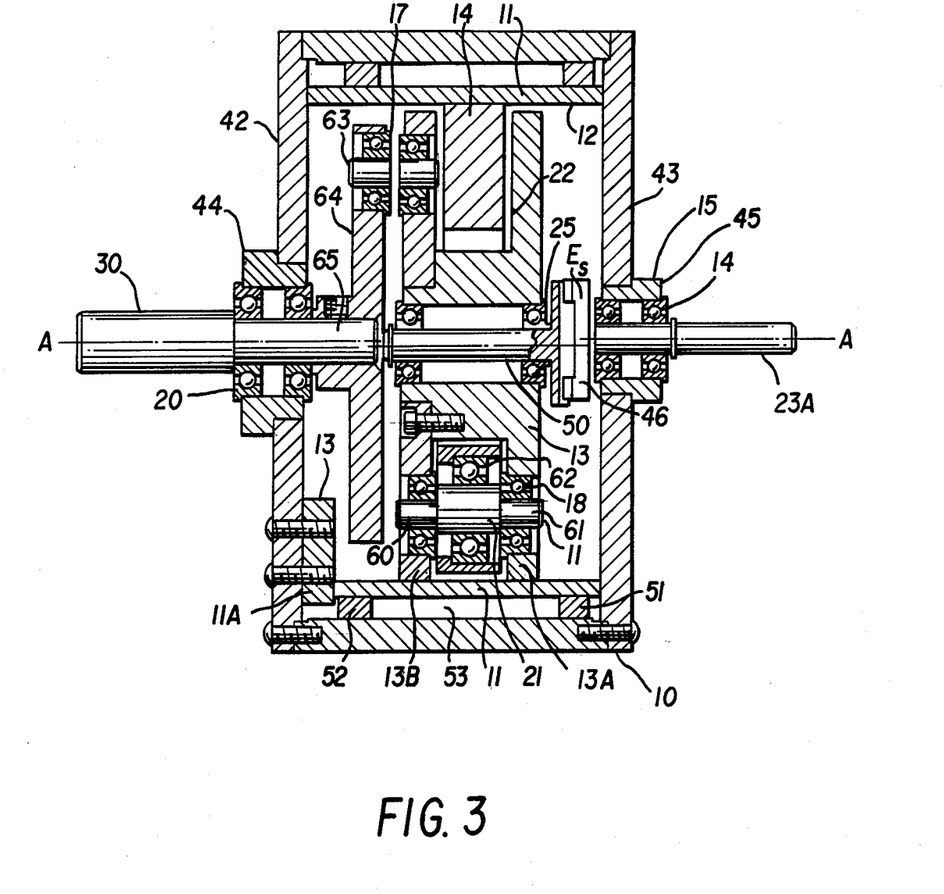
FIG. 3 is a longitudinal diametrical view of the embodiment of FIG. 2 taken along lines 3—3 of FIG. 2.

The roller 13 is in fact a dual or compound roller including two parts, each of the same diameter, namely roller part 13A and roller part 13B coupled together by hub 13C. The roller parts 13A and 13B are each respectively coupled to the roller 14 by individual crank arms represented by the single crank member 15 appearing in FIG. 1 which is journaled in the roller 13B by bearing assembly 16 and journaled in the roller 14 by roller or ball bearing assembly 20. Similar equally spaced crank arms 21 and 22 appearing in FIG. 1, each having the same offset as arm 15 as illustrated in the broken away portion of the roller 13B, allow hypocyclic movement of the rollers 13A, 13B and 14 with respect to the stator 11, each bearing upon the inner surface 12 of the stator 11 at diametrically opposed positions on the surface 12. The rollers 13 and 14 as may be seen in FIGS. 1 and 3 are smaller in diameter than the load ring 11 but have diameters greater than half the diameter of the annular surface 12 to allow for the presence of the cranks employed in this invention.

21 and 22 of FIG. 1 also couple the roller part 13A to the roller 14. The offset of the roller part 13A with respect to roller 14 is identical with that of roller part 13B whereby the areas of contact of the rollers 13A and 13B coincide radially on the surface 12 but are axially displaced and diametrically opposed to the position of the area of contact of the roller 14 on the bearing surface 12. This is more clearly illustrated in FIG. 3.

The roller 13 is coupled at its part 13B to a high speed lower torque shaft 23 which is eccentrically mounted with respect to a crank member 24 which in turn is rotatably positioned within a central opening in the roller part 13B by bearing assembly 25. The eccentricity of the crank member 24 matches the eccentricity of the roller 13. The eccentricity of the bearing or crank member 24 is equal to one-half the difference in diameters of roller surface 12 and roller 13 or 14. The eccentricity may be defined by the equation:

$$E_S = \tfrac{1}{2}(D_S - D_R) + A \quad (2)$$

where $Es$ = the eccentricity of crank member 24; and
$A$ = preload dimension.

(The numerical value for "A" is a designer decision base on trade-offs including the input speed, output torque, stator compliance, efficiency, unit life and material selection. The prototype unit successfully used a value of 0.005 for "A".)

The same criteria apply to a second or low speed shaft 30 coupled to the roller part 13A in the manner as is disclosed in FIG. 3.

Figure 3A:
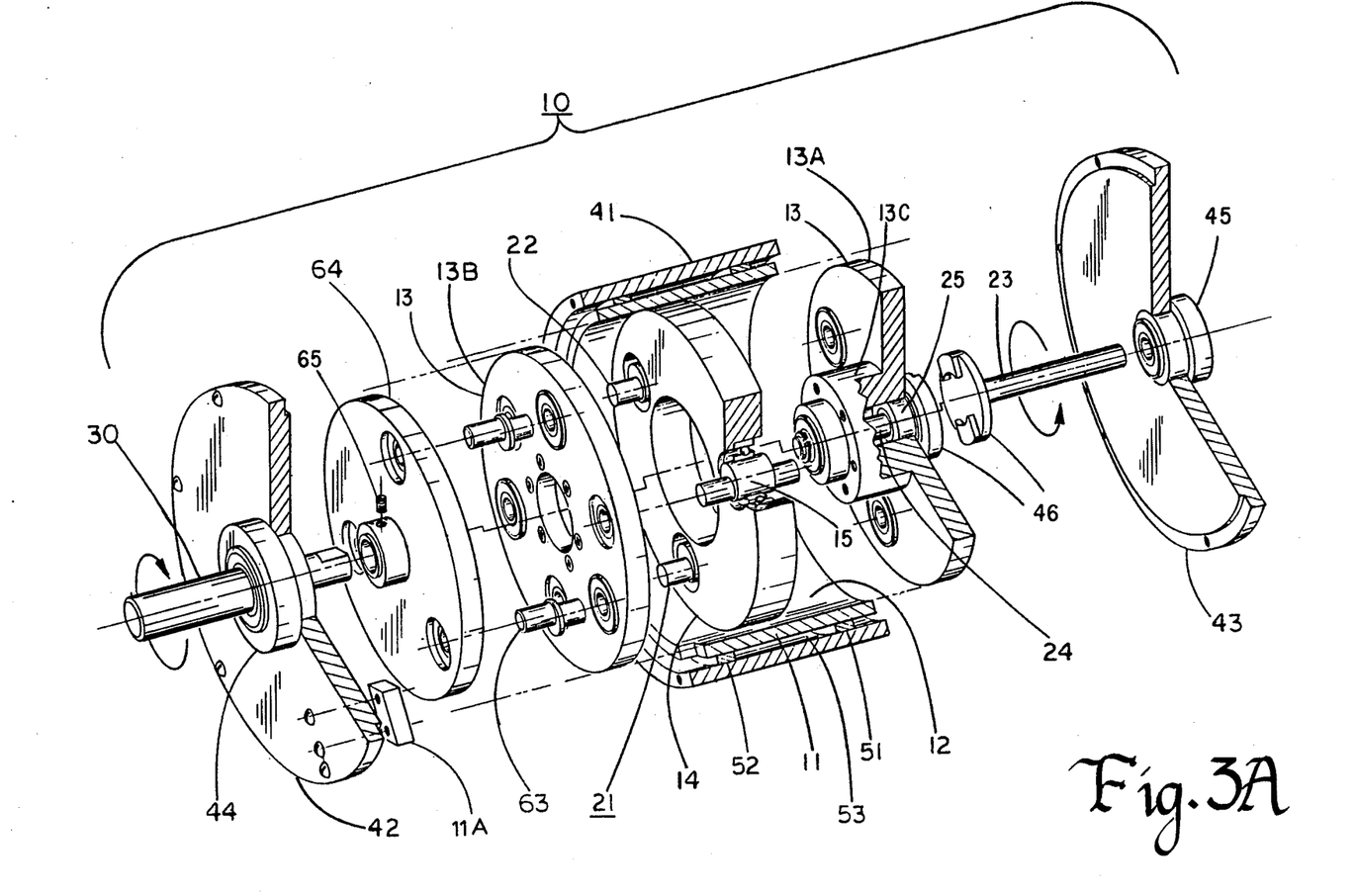
FIG. 3A is an exploded view partly in section of the combination of FIG. 3.

In FIGS. 1 and 3A, the shaft 30 is shown as having a larger diameter than shaft 23 since it constitutes the low speed, i.e. high torque end of the system. They both, however, may be of the same diameter. Of most importance is the fact that the shafts 23 and 30 are axially aligned so that the speed changer is an aligned shaft device enhancing its suitability for many applications. Offsets within the device are due illustrated in FIGS. 3 and 3A by the jogged centerline.

As disclosed in FIGS. 1 and 3A, a rotational movement of shaft 23 produces opposite direction rotation of shaft 30 at a fixed speed ratio as determined above.

In FIG. 1, the speed changer 10 is simplified for ease of comprehension of the fundamental elements of the invention. For a more complete understanding, attention is directed to FIG. 3A and particularly FIG. 3, the latter of which is a longitudinal sectional view taken along line 3—3 of FIG. 2 to which reference is also made.

Figure 2:
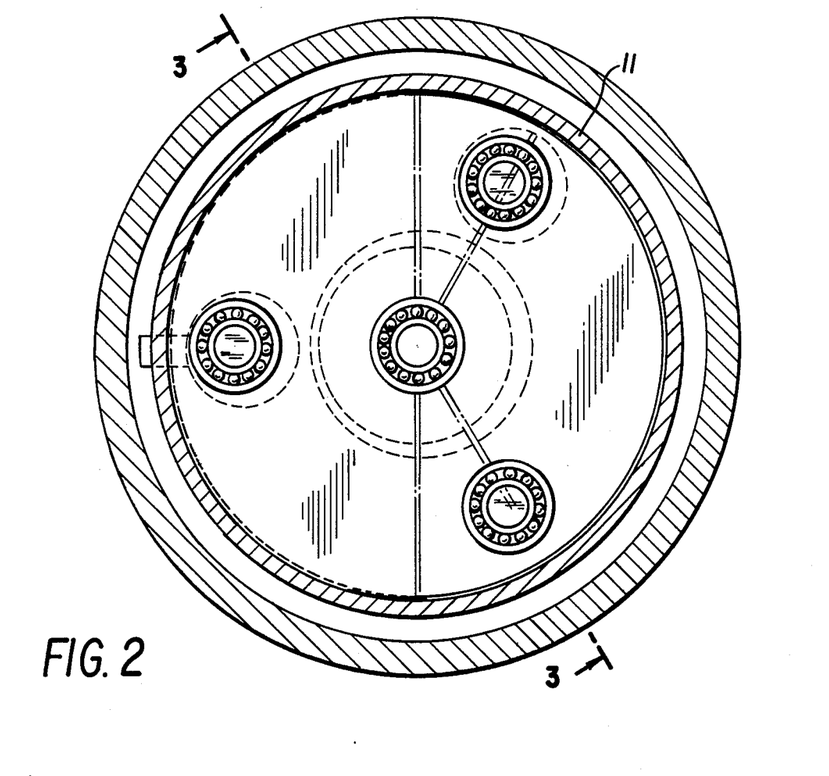
FIG. 2 is a transverse sectional view of an embodiment of this invention.

The embodiment of FIGS. 2 and 3, in addition to the operating elements of FIG. 1, includes an outer housing generally designated 40 including an outer annular wall 41, a pair of end plates 42 and 43, a low speed shaft bearing assembly 44, and a high speed bearing assembly 45. The eccentric links 63 have an offset or crank arm length equal to one half of the crank arm length of crank 21 as denoted in the drawing FIG. 3 by the difference in offset of the axes of their respective bearings.

Reviewing the system of FIG. 3 from the high speed shaft 23A end, we find that shaft 23A is journaled in bearings 45 of the outer housing and includes a tooth coupling 46 within the housing 40 coupling the high speed shaft 23A to roller shaft 50 which includes the eccentric 24. Note that the axis of shaft 50 is displaced from the aligned axes A—A of shafts 23 and 30. Journaled on the shaft 50 by a bearing 25 is the roller 13 with its two parts 13A and 13B engaging the bearing surface 12 at the lowermost point in FIG. 3. The loading ring 11 with its annular bearing surface 12 is located within the housing wall 41 by spacer rings 51 and 52 at the high speed and low speed sides of the assembly. Ring 11 is restrained from rotation by one or more key, one of which 11A appears in FIG. 3A.

In accordance with one feature of this invention, the cavity 53, formed between the outer wall 41 and the bearing member 11 may be fluid filled for efficient transfer of heat energy from the drive to the exterior of the housing 40. Additionally, the free unsupported section of the bearing member 11 between the spacer blocks 51 and 52 allows the bearing pressure applied by the rollers 13 and 14 to slightly distort the bearing surface 12 outward to provide more than line contact between the respective rollers and the bearing surface 12. This allows greater torque to be transmitted through the device, and by reason of the void 53, efficient cooling may be accomplished.

Roller 14 is coupled to roller 13 via a plurality of cranks, one of which, 21, appears in section in FIG. 3 with end shaft portions 60 and 61 coupled respectively to the roller portions 13A and 13B via bearings 62 and 18. The roller 14 engages the surface 12 at a diametrically opposite point from roller 13 as is illustrated particularly in FIG. 3. It is journaled by bearing 62 beyond shaft 21 and an additional number of bearing assemblies such as 16 and 20 of FIG. 1. Note that there is no additional spring member present in the system as described, relying principally on the resiliency of the bearing member 11 for any compliance in the system. This allows far greater torque to be transmitted through the system than devices heretofore.

The roller 13B is additionally coupled by a plurality, for example, three, eccentric links, one of which is shown in section, namely, 63, to a spider 64 which is secured to output shaft 30 by set screw 65. Shaft 30 is journaled in the housing 40 by bearing assembly 44. The links or crank member 63, the spider 64 and the shaft 30 together constitute a parallel link coupling to produce pure angular rotation of shaft 30.

By employing the arrangement of FIGS. 1–3, speed changes between the two aligned shafts of 100:1 or more are easily acomplished with virtually no backlash between the shafts 23 and 30. The drive system is preloaded and the traction elements engage each other, namely rollers 13 and 14, and annular track 12 at relatively large diametrically spaced positions. Thus, balanced loading of relatively low per unit area exists at the contact surfaces of the device. This is in marked contrast with epicyclic devices which encounter high localized loading on a central sun member.

The preloading is achieved merely by the resiliency of the annular member 11. This member 11 is easily cooled, again in contrast with epicyclic systems.

In certain embodiments a speed changer is desired in an annular drive system, for example in the mount of a shipborne radar antenna system which requires the central column for transmission lines. Precise positioning is a requirement of such systems.

Figure 4:
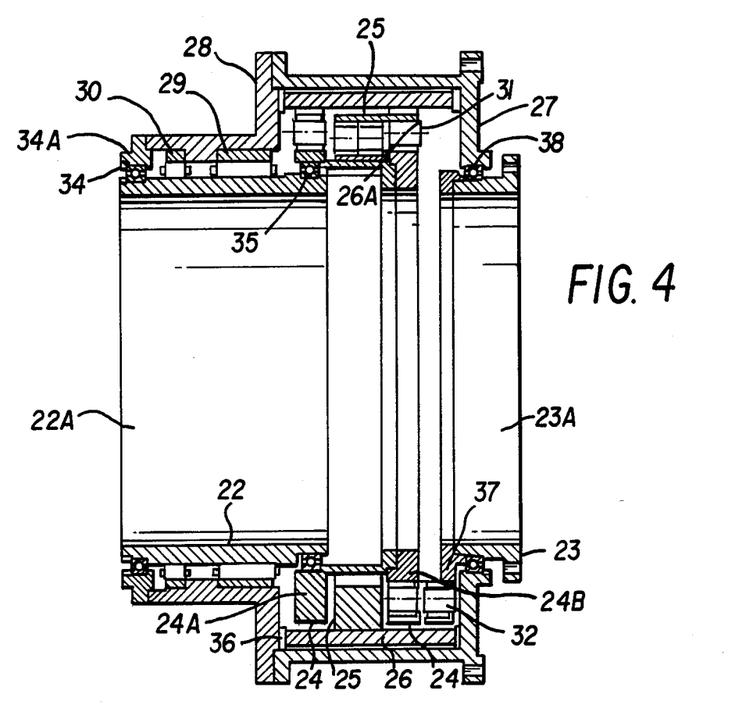
FIG. 4 is a longitudinal diametrical view of an annular embodiment of this invention.
Figure 5:
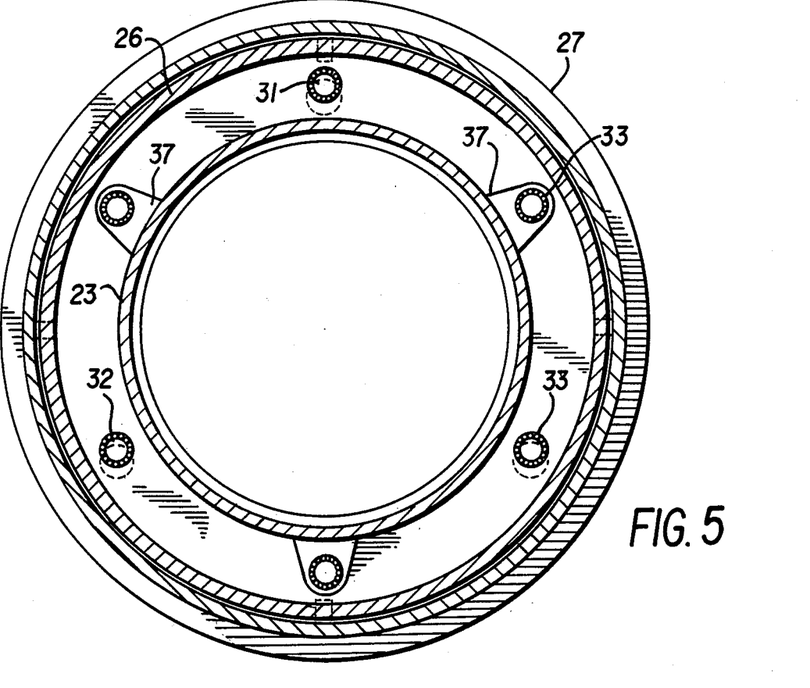
FIG. 5 is a transverse sectional view of the embodiment of FIG. 4 taken along line 5—5 of FIG. 4.

This invention is easily adapted to an annular or torque tube configuration. Such an embodiment is shown in FIGS. 4 and 5. Referring to FIGS. 4 and 5, a hollow drive system is disclosed containing its own drive or torque motor and a tachometer whereby the system is ready for direct integration into a servo system, for example a radar antenna mast with clearance room for the antenna feeds such as wave guides which pass through the central opening undisturbed by the drive system.

In FIGS. 4 and 5, a hollow high speed shaft 22 is shown timing its interior opening 22A which extends through the drive system to an aligned central opening 23A in hollow low speed shaft 23. The high speed shaft is encircled by a D.C. torque motor 29 and a D.C. tachometer 30. The torque motor drives the high speed shaft within the enclosing housing of the assembly made up of the drive housing 27 and the motor tachometer housing 28. The high speed shaft 22 is journaled in high speed shaft bearings 34 engaging an outer stepped flange 34A at the high speed end of the motor tachometer housing 28. The high speed shaft 22 is journaled at its inner ends by roller shaft bearing 35, which is eccentrically mounted on shaft 22, itself journaled in compound or dual roller 24 including a high speed end roller member 24A and a low speed end roller portion 24B. Eccentric link 31, which has a central offset, engages rollers 24A and 24B each end and engages reaction roller 25 at the central offset. As in the case of the embodiment of FIGS. 1–3, the compound roller 24 engages at one side of the annular surface 26A of the loading ring or stator 26 secured within the housing 27 by a plurality of (e.g. 4) anti-rotate keys 36. The two compound roller parts 24A and 24B again engage the loading ring 26 at a diametrically opposed position from the engagement of the reaction roller 25.

In FIG. 4, the compound roller 24 engages the loading ring at the top of the figure and the reaction roller 25 engages the loading ring at the bottom of the figure. In addition to the eccentric link roller 31 appearing in FIGS. 4 and 5, similar eccentric links 32 and 33 spaced at 120 degrees around the periphery secure the compound roller 24 and reaction roller 25 for synchronous angular rotation together subject to the axially displacement resulting from the offsets of each of the eccentric links 31, 32 and 33.

The angular rotation of the compound roller 24 is transmitted to a spider 37 in the form of a plurality (e.g. 3 or more) arms formed integrally with the hollow output shaft 23 engaging the compound roller part 24B at three equally distant spaces via spider eccentric links 32A, 33A and 31A. The low speed shaft is journaled in housing 27 by low speed shaft bearing 38.

Given the above described combination of FIGS. 4 and 5, each of the advantages of large speed change balance loading low backlash and linearity of speed changes accomplished and the system includes provision for in general driving, and speed monitoring while maintaining a clear annular opening. This design is particularly adaptable to the annular configuration since the larger the opening along the axis, the greater speed change ratio is possible, the greater torque transmition is possible and the lower the loading forces as compared with previous drives.

The above described embodiments are merely representative of the principles of this invention and are not to be considered as limiting. Rather this invention is defined by the following claims including their equivalents.

I claim:

1. A drive system for changing speed between a pair of shafts comprising:
   a first member defining an annular internal bearing surface having an axis;
   a first roller having a diameter less than the diameter of said annular internal bearing surface;
   a second roller having the same diameter as said first roller;
   crank means coupling said first and second rollers together in journaled relationship with respective rollers and with a crank arm of sufficient length to maintain said first and second rollers in intimate contact with said annular internal bearing surface;
   means mounting said first and second rollers and said crank means with axes parallel to the axis of said annular internal bearing surface;
   said crank means maintaining said first and second rollers in generally diametrically opposite spaced engagement with said annular internal bearing surface;
   means coupled to said first roller for introducing rotational movement therein about its central axis and generally parallel to the axis of said first member; and
   means coupled to said first roller for delivering rotational movement from said drive system at a speed related to the difference in diameter of said rollers and said annular internal bearing surface.

2. A drive system in accordance with claim 1 including a housing;

said housing mounting said annular internal bearing surface in fixed rotational relation therein.

3. A drive system for changing speed between a pair of shafts comprising:
- a first member defining an annular internal bearing surface having an axis;
- a first roller having a diameter less than the diameter of said annular internal bearing surface;
- a second roller having the same diameter as said first roller;
- crank means coupling said first and second rollers together with a crank arm of sufficient length to maintain said first and second rollers in intimate contact with said annular internal bearing surface;
- means mounting said first and second rollers and said crank means with axes parallel to the axis of said annular internal bearing surface;
- said crank means maintaining said first and second rollers in generally diametrically opposite spaced engagement with said annular internal bearing surface;
- means coupled to said first roller for introducing rotational movement therein about its central axis and generally parallel to the axis of the axis of said first member;
- means coupled to said first roller for delivering rotational movement from said drive system at a speed related to the difference in diameter of said rollers and said annular internal bearing surface;
- said drive system including a housing;
- said housing mounting said annular internal bearing surface in fixed rotational relation therein;
- wherein said means coupled to said first roller for introducing rotational movement therein includes additional crank means coupled to said first roller having a crank arm equal to half the crank arm of said first mentioned crank means; and
- said housing mounting means for journalling said additional crank means radially with respect to said annular internal bearing surface.

4. A drive system in accordance with claim 2 including means for converting the movement of said first roller to rotational motion with respect to the housing.

5. A drive system in accordance with claim 4 wherein said converting means comprises a parallel link coupling.

6. A drive system in accordance with claim 2 including an external shaft journaled in said housing and spider means coupling said first roller to said external shaft.

7. A drive system for changing speed between a pair of shafts comprising:
- a first member defining an annular internal bearing surface having an axis;
- a first roller having a diameter less than the diameter of said annular internal bearing surface;
- a second roller having the same diameter as said first roller;
- crank means coupling said first and second rollers together with a crank arm of sufficient length to maintain said first and second rollers in intimate contact with said annular internal bearing surface;
- means mounting said first and second rollers and said crank means with axes parallel to the axis of said annular internal bearing surface;
- said crank means maintaining said first and second rollers in generally diametrically opposite spaced engagement with said annular internal bearing surface;
- means coupled to said first roller for introducing rotational movement therein about its central axis and generally parallel to the axis of the axis of said first member;
- means coupled to said first roller for delivering rotational movement from said drive system at a speed related to the difference in diameter of said rollers and said annular internal bearing surface;
- said drive system including a housing;
- said housing mounting said annular internal bearing surface in fixed rotational relation therein;
- including an external shaft journaled in said housing and spider means coupling said first roller to said external shaft;
- including additional crank means coupling said first roller to said spider; and
- said additional crank means having a crank arm equal in length to half the difference in diameters between said rollers and said annular internal bearing surface.

8. A drive system in accordance with claim 2 including means mounting said annular internal bearing surface at a pair of axially displaced positions with an open region therebetween and between said annular internal bearing surface and said housing.

9. The combination in accordance with claim 1 wherein said first roller is a compound roller having two axially spaced roller surfaces.

10. The combination in accordance with claim 9 wherein said compound first roller includes roller surfaces on opposite sides of said second roller.

11. The combination in accordance with claim 9 wherein said axially spaced roller surfaces are concentric.

12. The combination in accordance with claim 11 wherein said crank means extends between said first roller parts and engages said second roller therebetween.

13. A Traction drive device comprising:
- a static member including an internal annular surface adjacent to an outer surface thereof;
- a first roller of smaller overall diameter than the internal annular surface of said static member and in rolling engagement with a portion thereof;
- a second roller of smaller diameter than the internal annular surface of said drive member and in rolling engagement with a different portion of said internal annular surface than the first roller;
- crank means in journaled engagement with said first and second rollers and having a crank arm sufficient to maintain said first and second rollers in engagement with said internal annular surface;
- a third roller of smaller overall dimension than the internal annular surface of said drive member and in rolling engagement with said internal annular surface;
- said crank means including a portion in journaled engagement with said second and third rollers and having a crank arm sufficient in length to maintain additionally said second and third rollers, in engagement with said internal annular surface;
- first shaft means coupled to said first and third rollers for the introducing of hypocyclic motion into said rollers;
- the means coupling said first shaft means to said first roller including an eccentricity corresponding to the eccentricity of said first roller whereby said first shaft rotates concentrically with the axis of said internal annular surface, and second shaft means coupled to said first and third rollers for extracting rotary motion from said traction drive device;

means coupling said second shaft means to said third roller including and eccentrically corresponding to the eccentricity of said first roller whereby said third shaft rotates concentrically with the axis of said internal annular surface;

whereby rotary motion may be transmitted through said traction drive device between said first and second shaft means with a speed change related to the differences in diameter of the internal annular surface and said first and third rollers.

14. The traction device in accordance with claim 13 wherein said first and second rollers engage said internal annular surface at substantially diametrically opposite positions.

15. The traction device in accordance with claim 13 wherein said second and third rollers engage said internal annular surface at substantially diametrically opposite positions.

16. A traction drive device in accordance with claim 13 wherein the means for coupling said first and third rollers to said first and second shafts, respectively, comprise crank arms.

17. The combination in accordance with claim 13 including a housing mounting said static member in rotationally fixed position within said housing;
said housing including means positioning and journalling said first and seocnd shafts for rotation.

18. A traction drive device in accordance with claim 13 wherein said crank means comprise a plurality of journaled crank arms circumferentially displaced from each other with respect to the axis of said internal annular surface.

19. The combination in accordance with claim 18 wherein said journaled crank arms number at least 3.

20. A traction drive device in accodance with claim 13 wherein said internal annular surface is a cylindrical surface of revolution.

21. The combination in accordance with claim 20 wherein said first, second and third rollers have cylindrical surfaces in engagement with said cylindrical internal annular surface.

22. The combination in accordance with claim 13 wherein said first and third rollers are axially displaced along the axis of said internal annular surface.

23. The combination in accordance with claim 13 wherein said first and second rollers are located on opposite ends of said second roller.

24. The combination in accordance with claim 13 wherein said first and third rollers are interconnected to constitute a single rolling member.

25. A traction drive speed changing device comprising:
a static member including an internal annular bearing surface;
a first roller of smaller overall diameter than the internal annular bearing surface of said drive member and in rolling engagement with a portion thereof;
a second roller of smaller overall diameter than the internal annular bearing surface of said drive member and in rolling engagement with a different portion of said internal bearing surface than the first roller;
crank means in journaled engagement with said first and second rollers and having lateral length sufficient to maintain said first and second rollers in engagement with said internal bearing surface;
first and second rotary motion conveying means coupled to said first roller for the conveying of rotary motion through said device;
said first rotary motion conveying means coupled to said first roller by a first means including an eccentricity corresponding to one length of the crank arm of said crank means whereby said first rotary motion conveying rotates concentrically with the axis of said internal bearing surface; and
said second rotary motion conveying means coupled to said first roller by a second means including an eccentricity corresponding to one half of the length of crank arm of said crank means whereby said first rotary motion conveying means rotates concentrically with the axis of said internal bearing surface;
whereby rotary motion may be transmitted through said device between said first and second rotary motion conveying means with a speed change related to the differences in diameter of the internal bearing surface and said first and second rollers.

26. The combination in accordance with claim 25 wherein said first and second rollers comprise a binary synchronized eccentrically coupled roller assembly.

27. The combination in accordance with claim 25 wherein said first roller includes a pair of axially displaced rollers embracing said second roller and
wherein said crank means comprises a double ended crank having the end sections engaging respective first rollers and the intermediate portion engaging said second roller whereby said first and second rollers are displaced laterally by an amount equal to the lengths of the crank arms of said crank means.

28. The combination in acordance with claim 25 wherein said crank means maintains said first and second rollers in diametrically opposite contact with said internal annular bearing surface.

29. A traction drive system for producing a speed change between an input and an output member comprising:
a first traction member defining an annular internal bearing surface having a central axis;
a first roller having a diameter less than the diameter of said annular internal bearing surface;
a second roller having the same diameter as said first roller;
said first and second rollers having diameters greater than one half the diameter of said annular internal bearing surface;
first crank means coupling said first and second rollers together in journaled relationship with respective rollers and with a crank arm of sufficient length to maintain said first and second rollers in generally diametrically oppositely spaced intimate contact with said annular internal bearing surface;
means mounting said first and second rollers and said first crank means with axes parallel to the central axis of said annular internal bearing surface;
means coupled to said first roller for introducing hypocyclic movement therein about said central axis; and
means coupled to said first roller for extracting rotary movement from said first roller at a rate difference with respect to the rotational movement introduced into said first roller related to the difference in diameters of said annular surface and the diameter of said first roller.

30. The combination in accordance with claim 29 wherein said first and second rollers have coaxial openings therethrough and define a generally unobstructed opening through said device within said annular bearing surface.

* * * * *